US006881374B2

United States Patent
Gerhard et al.

(10) Patent No.: US 6,881,374 B2
(45) Date of Patent: Apr. 19, 2005

(54) METHOD FOR INDUCTION LAMINATION OF ELECTRICALLY CONDUCTIVE FIBER REINFORCED COMPOSITE MATERIALS

(75) Inventors: Jack K. Gerhard, Ridgeley, WV (US); Eric J. Lynam, Keyser, WV (US); Mark R. Shaffer, Hyndman, PA (US); Shridhar Yariagadda, Newark, DE (US); Nicholas B. Shevchenko, Newark, DE (US); Bruce K. Fink, Havre de Grace, MD (US); Dirk Heider, Newark, DE (US); John J. Tierney, Newark, DE (US); John W. Gillespie, Jr., Hockessin, DE (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/253,032

(22) Filed: Sep. 24, 2002

(65) Prior Publication Data

US 2003/0062118 A1 Apr. 3, 2003

Related U.S. Application Data

(60) Provisional application No. 60/324,966, filed on Sep. 25, 2001.

(51) Int. Cl.[7] .......................... B29C 33/02; B29C 35/08; B29C 35/16
(52) U.S. Cl. ...................... 264/487; 264/486; 264/40.1; 264/294; 264/348
(58) Field of Search ............................... 264/486, 487, 264/494, 495, 496, 40.1, 294, 345, 348; 425/143, 160, 163

(56) References Cited

U.S. PATENT DOCUMENTS 2,372,929 A  4/1945  Blessing
3,826,628 A  7/1974  Addinall et al.

(Continued)

FOREIGN PATENT DOCUMENTS

| EP | 0 891 862 A1 | 1/1999 |
| EP | 1 023 955 A1 | 8/2000 |
| WO | WO 01/87571 A2 | 11/2001 |
| WO | WO 02/30657 A1 | 4/2002 |

OTHER PUBLICATIONS

International Search Report of Nov. 22, 2002.
PCT Written Opinion, dated Apr. 15, 2003, 2 pages.
PCT International Preliminary Examination Report, dated Sep. 25, 2003, 6 pages.

*Primary Examiner*—Angela Ortiz
(74) *Attorney, Agent, or Firm*—TraskBritt

(57) ABSTRACT

A method and apparatus for forming laminate composite structures. At least two laminae, each containing electrically conductive reinforcing fibers, are placed upon each other in contacting relationship to form a generally layered structure. The layered structure may be subjected to heat to conductively transfer heat through the layered structure and thereby improve the surface contact between two laminae. The layered structure is volumetrically heated by inductively transferring energy to the electrically conductive reinforcing fibers. The heated, layered structure is consolidated, such as by applying pressure and reducing the temperature of the layered structure. The consolidated structure is then quenched by rapidly cooling the consolidated structure in a directionally controlled manner about a midplane thereof.

30 Claims, 7 Drawing Sheets

U.S. PATENT DOCUMENTS

| | | |
|---|---|---|
| 3,912,542 A | 10/1975 | Hirano et al. |
| 4,029,837 A | 6/1977 | Leatherman |
| 4,109,543 A | 8/1978 | Fotl |
| 4,313,777 A | 2/1982 | Buckley et al. |
| 4,445,951 A | 5/1984 | Lind et al. |
| 4,454,402 A | 6/1984 | Sander et al. |
| 4,469,543 A | 9/1984 | Segal et al. |
| 4,777,005 A | 10/1988 | Miller |
| 4,871,412 A | 10/1989 | Felix et al. |
| 4,913,861 A | 4/1990 | Mishima et al. |
| 4,955,803 A | 9/1990 | Miller et al. |
| 4,978,825 A | 12/1990 | Schmidt et al. |
| 5,001,319 A | 3/1991 | Holmstrom |
| 5,097,585 A | 3/1992 | Klemm |
| 5,229,562 A | 7/1993 | Burnett et al. |
| 5,240,542 A | 8/1993 | Miller et al. |
| 5,246,520 A | 9/1993 | Scanlon et al. |
| 5,248,864 A | 9/1993 | Kodokian |
| 5,338,497 A | 8/1994 | Murray et al. |
| 5,357,085 A | 10/1994 | Sturman, Jr. |
| 5,530,227 A | 6/1996 | Matsen et al. |
| 5,571,436 A | 11/1996 | Gregg et al. |
| 5,645,747 A | 7/1997 | Matsen et al. |
| 5,698,053 A | 12/1997 | Carroll et al. |

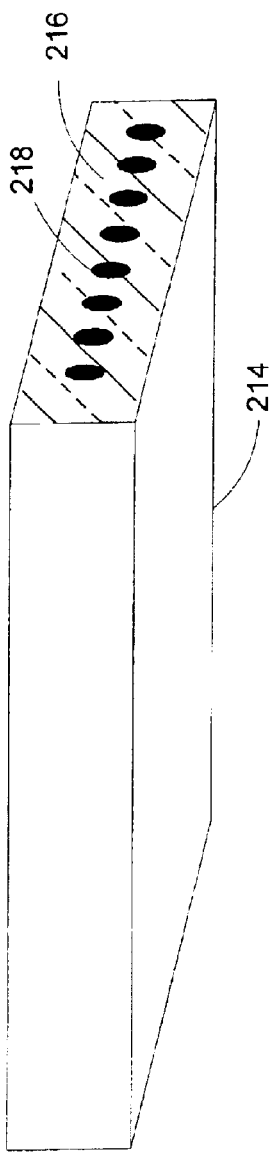
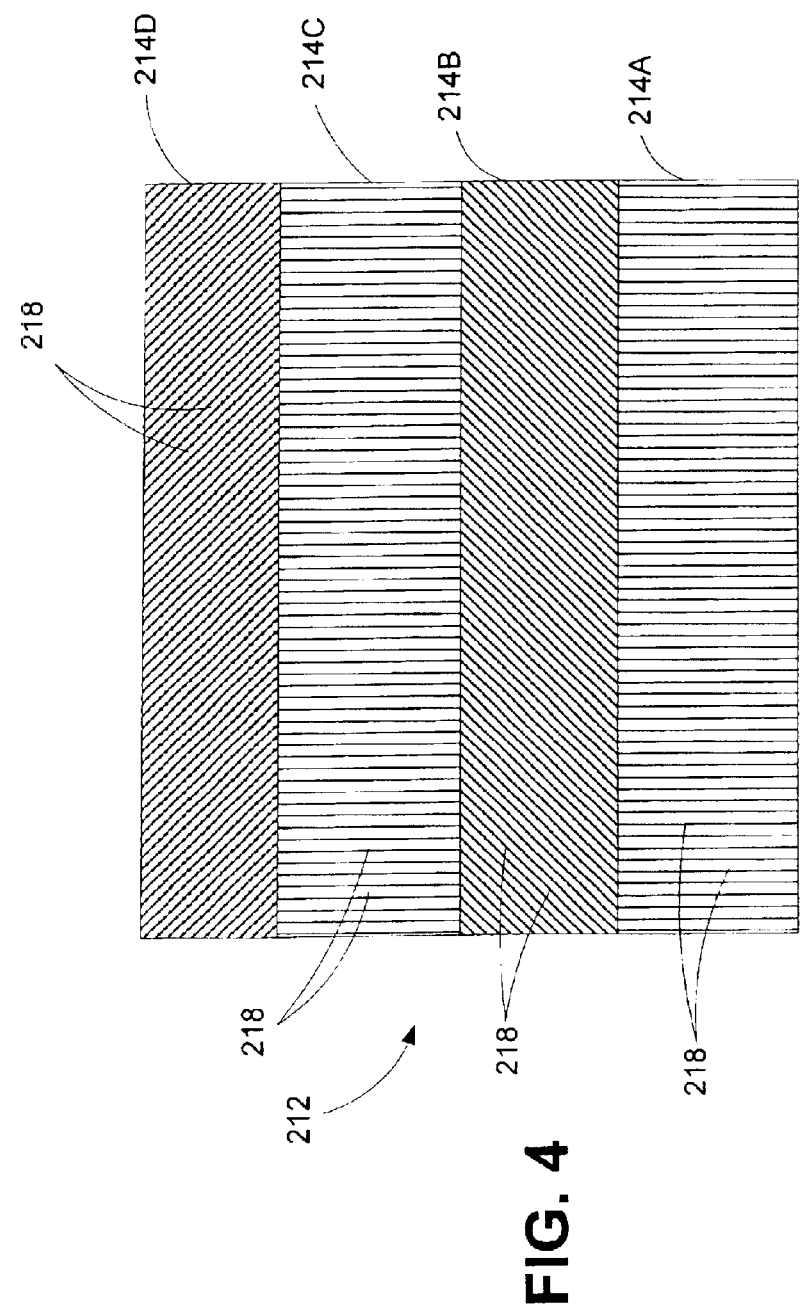

METHOD FOR INDUCTION LAMINATION OF ELECTRICALLY CONDUCTIVE FIBER REINFORCED COMPOSITE MATERIALS

CROSS-REFERENCE TO RELATED APPLICATION

This application claims the benefit of U.S. Provisional Application No. 60/324,966, filed Sep. 25, 2001.

BACKGROUND OF THE INVENTION

1. Field of the Invention

The present invention relates generally to the formation of composite structures and, more particularly, to the formation of substantially void-free laminate structures using inductive energy.

2. State of the Art

Composite articles are well known to provide advantages in diverse applications. In some applications, the advantages of composite articles over metal, ceramic or other materials include weight reduction and the ability to integrate several otherwise individual parts into a single structure. Composite articles may conventionally include a reinforcement material in a polymer-based resin, also known as the matrix material, such as thermoplastic or thermoset resin. The reinforcement materials may include, for example, chopped or continuous fibers disposed either randomly or in ordered fashion within the polymer matrix material. Composite materials are conventionally formed by configuring the reinforced matrix material into a desired form or structure, which may include heating the article to place the matrix material in a moldable condition followed by resolidification in the case of a thermoplastic, and curing of the matrix material in the case of thermoset resins.

Conventionally, composite structures are often formed as laminates, meaning that laminae, or multiple lamina, are layered on top of each other and bonded together by heating, thereby effecting melting in thermoplastics and effecting cross-linking between the multiple layers for thermoset resins. Additionally, a consolidation process is conventionally carried out on laminate structures to increase adhesion and reduce voids between the laminae. Such consolidation is conventionally carried out by processes such as vacuum debulk or through use of an autoclave.

One limitation associated with manufacturing composite articles or structures is the rate at which such articles may be processed, especially for composite articles exhibiting large cross-sectional areas. For example, existing techniques such as autoclave, pultrusion and double belt press techniques are limited at the rate by which thermal equilibrium can be achieved within the material during processing.

Conventionally, heating of composite articles has been carried out through surface heating techniques. However, the thicker the composite structure, the more difficult and time consuming it becomes to achieve the proper temperatures at or near the center of the structure. In order to reduce the process or cycle times of producing a laminate composite structure, the surface temperature may be increased in order to more quickly transfer thermal energy to the center of the composite structure. Referring to FIG. 1, an exemplary graph 100 shows the need to increase surface temperature of a composite structure in order to increase the throughput, or the amount of material processed in a given amount of time, in a conventional surface heating process. For example, the first plot 102 indicates that in order to maintain an exit temperature of 480° F. for a composite structure having a thermoplastic matrix, the surface temperature of the composite structure during processing must be increased approximately 1000° F. in order to realize a corresponding increase in the rate of throughput by approximately 19 feet/second (ft/sec). Similarly, as seen in the second plot 104, to maintain an exit temperature of 625° F. throughout the composite structure, an increase in surface temperature of approximately 1200° F. is required to increase the throughput by approximately 19 ft/sec.

However, the allowable surface temperature of the composite laminate structure is limited by its degradation temperature, which, in turn, limits the throughput or production rate. Thus, in using conventional surface heating techniques, the tradeoffs for improving production times include an increase in both capital costs and labor (i.e., through implementation of parallel production lines) and/or the production of a potentially degraded and inferior product.

In an attempt to improve production times, inductive heating techniques have been implemented in the production of composite structures. Induction heating techniques conventionally take advantage of the inductive transfer of energy from an induction coil to a conductive member either positioned adjacent a surface of the composite structure or disposed within the composite structure, such as between individual laminae or in the matrix material of an individual lamina.

For example, U.S. Pat. No. 5,229,562 issued to Burnett et al. discloses inductively heating a conductive member, such as a platen or a mandrel, which is positioned against a surface of the composite structure. However, such a method presents problems similar to those discussed above since the use of platens or mandrels is simply another means of surface heating the composite structure.

Another inductive heating technique includes placing a conductive member, such as a susceptor or a metal insert, into the composite and transferring energy through the insert and into the body of the composite. Such a technique, which may generally be referred to herein as volumetric heating, serves to bring the composite structure to thermal equilibrium much more efficiently. While volumetric heating brings the composite structure to thermal equilibrium much more quickly than surface heating, the use of metal inserts or susceptors to accomplish such may serve to mechanically weaken the resulting structure.

Another inductive heating technique involves transferring inductive energy to electrically conductive reinforcing fibers placed within the matrix material of a composite structure. For example, U.S. Pat. No. 4,871,412 issued to Felix et al., the disclosure of which is incorporated by reference herein, teaches the formation of local spot welds and seam welds for lap joints between two composite structures by inductively transferring energy to carbon fibers disposed within the two structures.

U.S. Pat. No. 5,357,085 issued to Sturman, Jr., the disclosure of which is incorporated by reference herein, teaches the heating of a polymer matrix composite stand by passing the strand through a helical guide tube adjacent an inductive coil to transfer energy into carbon fibers of the composite strand.

U.S. Pat. No. 5,338,497 issued to Murray et al., the disclosure of which is incorporated by reference herein, teaches forming a thick composite structure by placing the composite material into a mold and inductively transferring energy into conductive elements, such as metal whiskers, disposed in the matrix material while the composite material is in the mold.

However, while teaching volumetric heating of a composite structure, the above-referenced processes fail to address the use of volumetric heating in the high-volume production of laminate structures while retaining laminate quality, including the prevention of internal voids or warping. While conventional consolidation techniques may be used to reduce voids, i.e., through the use of an autoclave or by subjecting the structure to vacuum debulk, such techniques are time consuming and also require consumable or disposable waste materials. Such waste materials might include, for example, release films, bagging materials or nitrogen based volatiles used during pressurization.

In view of the shortcomings in the art, it would be advantageous to provide an apparatus and a method for forming laminated composite structures which allow for volumetric heating and prevent the subsequent growth of voids while also increasing throughput rates. It would be further advantageous to provide an apparatus and method which allow for continuous production of a laminate composite structure without the need for consumable waste materials conventionally used during consolidation.

BRIEF SUMMARY OF THE INVENTION

In accordance with one aspect of the invention, a method is provided for forming a composite laminate structure. The method includes providing at least two laminae containing electrically conductive reinforcing fibers, the two laminae being configured in a layered arrangement. The layered arrangement is volumetrically heated by inductively transferring energy to the electrically conductive reinforcing fibers contained in the at least two laminae. At least a portion of the layered arrangement is cooled while pressure is substantially simultaneously applied thereto. The layered arrangement is substantially symmetrically quenched about a midplane of the layered arrangement to reduce the temperature of the interior portion of the layered arrangement and to prevent the growth of internal hot voids between the laminae and warping of the resultant structure.

In accordance with another aspect of the invention, another method is provided for forming a composite laminate structure. The method includes providing at least two laminae containing electrically conductive reinforcing fibers, the two laminae being configured in a layered arrangement. The layered arrangement is volumetrically heated by inductively transferring energy to the electrically conductive reinforcing fibers contained in the at least two laminae. At least a portion of the layered arrangement is cooled while pressure is substantially simultaneously applied thereto. The layered arrangement is asymmetrically quenched relative to a midplane of the layered arrangement to reduce the temperature of the interior portion of the layered arrangement to form the layered arrangement into a desired shape, or to provide the resulting structure with a preconfigured stress state.

In accordance with yet another aspect of the present invention, a further method of forming a composite laminate structure is provided. The method includes providing a first lamina of thermoplastic material containing a first plurality of electrically conductive reinforcing fibers. At least one other lamina of thermoplastic material containing another plurality of electrically conductive reinforcing fibers is placed upon the first lamina of thermoplastic material to form a layered arrangement. The surface of the layered arrangement is heated to increase contact between the first lamina of thermoplastic material and the at least one other lamina of thermoplastic material. The layered arrangement is volumetrically heated and melted by inductively transferring energy to the electrically conductive reinforcing fibers. The melted layered arrangement is then consolidated, such as by application of pressure with a cooled roller. The consolidated layered arrangement is quenched substantially symmetrically about a midplane thereof to reduce the internal temperature and to prevent the growth of internal voids and warping of the resultant structure.

In accordance with a further aspect of the present invention, yet another method of forming a composite laminate structure is provided. The method includes providing a first lamina of thermoset material containing a first plurality of electrically conductive reinforcing fibers. At least one other lamina of thermoset material containing another plurality of electrically conductive reinforcing fibers is placed upon the first lamina of thermoset material to form a layered arrangement. The layered arrangement is volumetrically heated and partially cured by inductively transferring energy to the electrically conductive reinforcing fibers. The partially cured layered arrangement is then consolidated, such as by application of pressure with a cooled roller. The consolidated layered arrangement is quenched substantially symmetrically about a midplane thereof to reduce the internal temperature and to prevent the growth of internal voids and warping of the resultant structure.

In accordance with another aspect of the invention, an apparatus for producing a composite laminate structure is provided. The apparatus includes a preheating zone configured and located to heat a surface of a layered structure. An induction coil is configured and located to transfer energy to a plurality of electrically conductive reinforcing fibers contained in the layered structure. A consolidation zone is configured and located to remove voids from the layered structure subsequent to the transfer of inductive energy to the layered structure. A quenching zone is configured and located to rapidly cool the layered structure symmetrically about a midplane thereof subsequent to the consolidation of the layered structure, thereby preventing the growth of hot internal voids. A drive is configured and located to continuously convey the layered structure through the preheating zone, past the induction coil, through the consolidation zone, and through the quenching zone.

In accordance with another aspect of the invention, an apparatus for producing a composite laminate structure is provided. The apparatus includes a preheating zone configured and located to heat a surface of a layered structure. An induction coil is configured and located to transfer energy to a plurality of electrically conductive reinforcing fibers contained in the layered structure. A consolidation zone is configured and located to remove voids from the layered structure subsequent to the transfer of inductive energy to the layered structure. A quenching zone is configured and located to rapidly cool the layered structure asymmetrically relative to a midplane thereof subsequent to the consolidation of the layered structure to form the layered structure in a desired shape or to induce a desired stress state into the structure. A drive is configured and located to continuously convey the layered structure through the preheating zone, past the induction coil, through the consolidation zone, and through the quenching zone.

BRIEF DESCRIPTION OF THE SEVERAL VIEWS OF THE DRAWINGS

The foregoing and other advantages of the invention will become apparent upon reading the following detailed description and upon reference to the drawings in which:

FIG. 3 is an enlarged view of a portion of the apparatus shown in FIG. 2;

FIG. 4 is an isometric view of a fiber reinforced laminae;

DETAILED DESCRIPTION OF THE INVENTION

Figure 1:
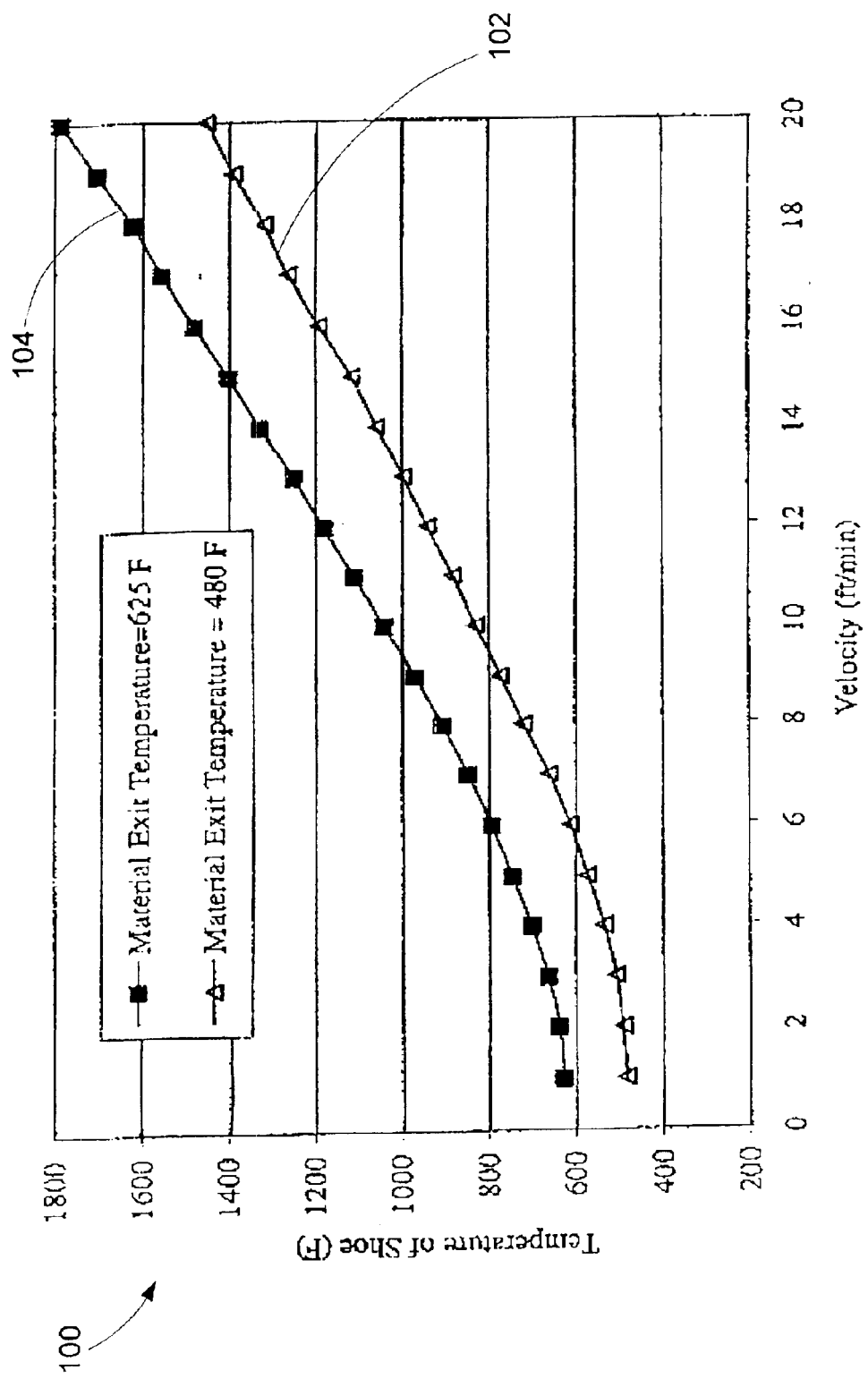
FIG. 1 is a graph showing the throughput of a composite structure relative to the surface temperature of the composite structure based on prior art surface heating techniques.
Figure 2:
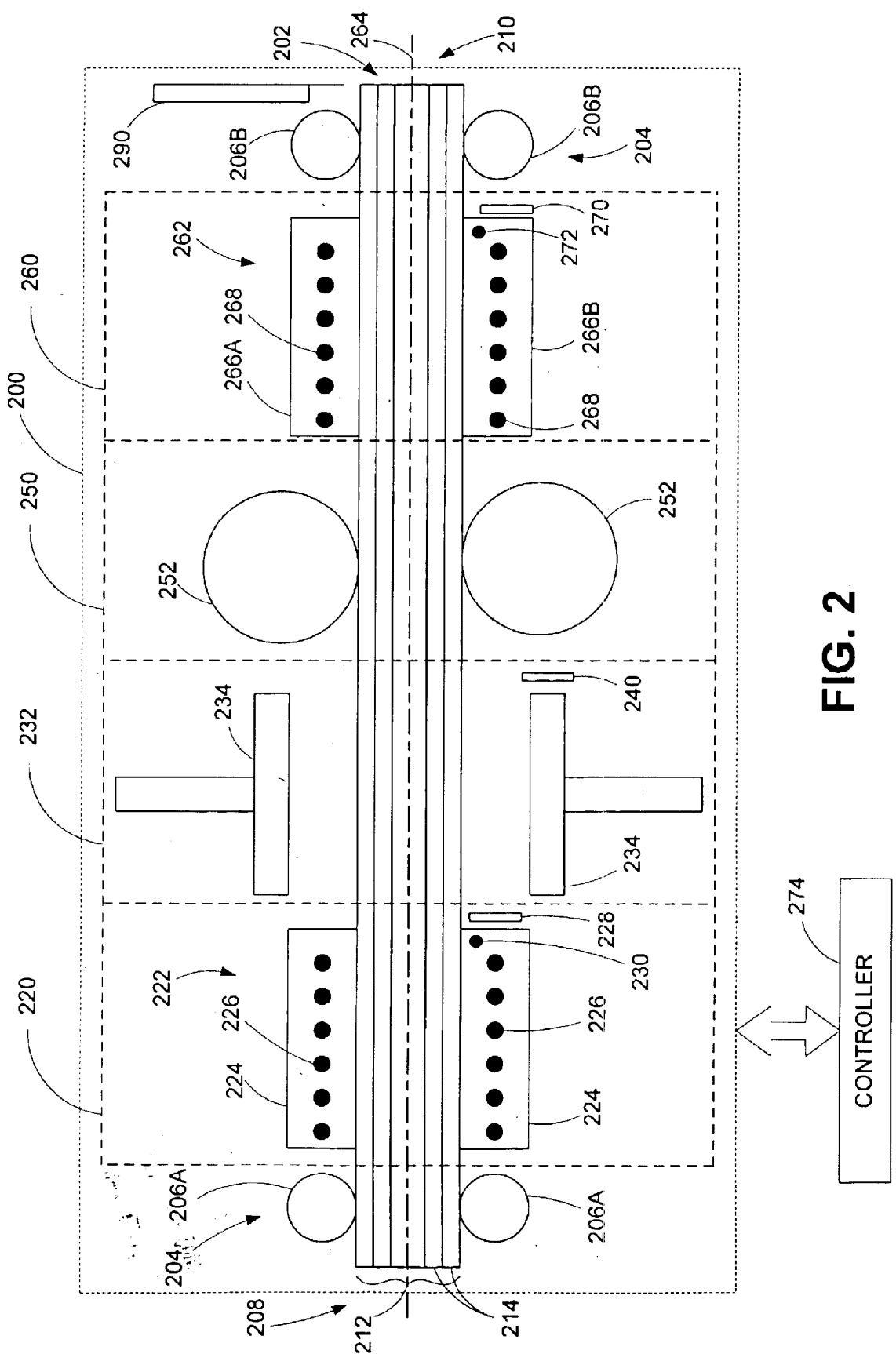
FIG. 2 shows an apparatus for processing laminate composite structures according to one embodiment of the present invention.

Referring to FIG. 2, an apparatus 200 for producing laminated composite structures 202 is shown. The apparatus may be generally referred to herein as a laminator. The laminator 200 may be described as having various zones, with each zone providing a specified function as shall be detailed below. The laminator 200 includes a drive 204 for conveying the composite structure 202 through the various zones thereof. The drive 204 may include one or more drive rollers 206A, 206B at the inlet 208 and/or outlet 210, respectively, of the laminator 200. Alternatively, the drive may include other components such as a conveyor system. The drive 204 is desirably configured to convey the composite structure 202 continuously through the laminator 200 and is adjustable such that different composite structures having, for example, different thicknesses may be processed at different throughput speeds. The drive 204 is also configured to provide adjustable tension in the reinforcing fibers 218 (FIGS. 3 and 4) of the composite structure 202 as it is being conveyed through the laminator 200. The application of a desired amount of tension within the composite structure 202 reduces fiber waviness and improves resultant mechanical and dimensional properties thereof. The amount of tension provided by the drive 204 may be based, in part, on the tensile strength and modulus of the reinforcing fibers 218. Additionally, if desired, the amount of tension provided by the drive 204 may also provide a predetermined amount of "prestress" in the resultant structure.

The composite structure 202 initially begins as a layered structure 212 or a layered arrangement of lamina 214. The layered structure 212 may include various materials and exhibit various configurations as will be appreciated and understood by those of ordinary skill in the art. For example, the layered structure 212 may include a stack of prepreg layers, commingled fabrics or a mix of thermoplastic layers and woven fabrics or 3-D preforms. The fabric in such structures may include, for example, electrically conductive material such as carbon fibers. In addition to containing an electrically conductive material, the layered structure 212 may include nonelectrically conductive reinforcing material.

Referring briefly to FIG. 3, an isometric cross-sectional view of an exemplary lamina 214 shows that the lamina 214 may be formed of a matrix material 216 having reinforcing fibers 218 disposed therein. The matrix material 216 may include a thermoplastic polymer such as, for example, polyetherimide (PEI) or polyetheretherketone (PEEK). Alternatively, the matrix material may include a thermoset polymer such as an epoxy. The reinforcing fibers 218 may be formed of an electrically conductive material and may include, for example, carbon fibers. Such electrically conductive reinforcing fibers 218 are sufficiently conductive so as to generate heat when exposed to an alternating magnetic field.

An individual lamina 214 may have the reinforcing fibers 218 oriented in a unidirectional manner to provide the lamina 214 with certain desirable mechanical properties. In such a case, laminae 214 may be stacked or layered such that the reinforcing fibers 218 of a given lamina 214 are angled with respect to the reinforcing fibers 218 of another lamina in the layered structure 212. For example, referring to FIG. 4, a layered structure 212 is shown including four laminae 214A–214D with some of the laminae "peeled" back to reveal the orientation of their respective reinforcing fibers 218.

The example shown in FIG. 4 includes a first lamina 214A having reinforcing fibers 218 unidirectionally oriented in what may be termed the 0° direction. The 0° direction of the reinforcing fibers in lamina 214A may also be the intended direction of travel of the composite structure 202 as it is conveyed through the laminator 200. The reinforcing fibers 218 of the second lamina 214B are unidirectionally oriented at an angle, for example at 30°, relative to the first lamina 214A. The reinforcing fibers 218 of the third lamina 214C are unidirectionally oriented in the 0° direction, or substantially parallel with those of the first lamina 214A. The reinforcing fibers 218 of the fourth lamina 214D are unidirectionally oriented at an angle, such as at –30° relative to those of the first and third laminae 214A and 214C. Additional lamina 214 may be added with a similar repeating pattern. Of course, other patterns are contemplated and may be incorporated into the laminated composite structure in accordance with the present invention.

The arrangement of the layered structure 212 shown in FIG. 4 serves multiple purposes. As noted above, the orientation of the reinforcing fibers 218 serves to determine the mechanical properties of the resulting composite structure. For example, the tensile modulus and strength of the composite structure is affected by the relative orientation of the reinforcing fibers 218. Additionally, the overlapping nature of the reinforcing fibers 218 according to the arrangement shown in FIG. 4 allows for an electrical circuit to be completed within the respective laminae 214 when the layered structure 212 is subjected to the inductive flux generated by an induction apparatus 234 (FIG. 2). A layered structure 212 having all the reinforcing fibers 218 unidirectionally oriented in the same direction (i.e., no overlapping) will not become volumetrically heated by induction since a closed electrical pathway cannot be formed with the reinforcing fibers 218.

Alternatively, instead of having conductive reinforcing fibers 218 in every lamina 214 of the layered structure 212, at least one of the lamina 214 might include conductive reinforcing fibers 218 arranged in an overlapping arrangement, or a conductive fiber mesh might be disposed within an individual lamina 214 with adjacent lamina including nonconductive reinforcing members. Thus, an internal lamina 214 with the conductive reinforcing members might be used in generating internal heat.

Referring back to FIG. 2, the layered structure 212 is first subjected to a preheat zone 220 which includes surface heaters 222 for heating the surface of the layered structure 212. By preheating the layered structure 212, surface contact between the laminae 214 is increased, which may aid in effective volumetric heating of the layered structure 212, a subsequent step in the process. The surface heaters 222 shown in FIG. 2 include platens 224 having heating elements 226 formed therein. Such heating elements 226 may include, for example, electrical resistance heaters, or radiant heating coils.

The preheat zone 220 may also include one or more sensors for determining the temperature of the layered structure 212 or the surface heaters 222 or both. For example, an infrared sensor 228 may be utilized to determine the surface temperature of the layered structure 212. Similarly, a thermocouple 230 or like device might be placed in the platens 224 of the surface heaters 222 to monitor their temperature and performance. Furthermore, the sensor 228 and thermocouple 230 might be incorporated as part of a control loop such as, for example, closed loop feedback control of the surface heaters 222 for greater control of the temperature thereof.

For example, it may be desirable to preheat the layered structure by application of heat at approximately 300° C. to improve surface contact between the lamina 214. Additionally, it may be desirable to maintain the temperature of the platens 224 within a specified range, such as, for example, within (±) 2° C. of a desired temperature. In another embodiment, it may be desirable to apply heat at a temperature of approximately 375° C. and maintain the temperature within (±) approximately 3° C.

It is noted that the preheat zone 220 is more beneficial in processing a layered structure 212 having lamina 214 formed of a thermoplastic matrix. Thus, if desired, the preheat zone 220 might be disabled during the processing of a layered structure 212 having lamina 214 formed of a thermoset matrix.

After passing through the preheat zone 220 of the laminator 200, the layered structure enters a volumetric heating zone 232. The volumetric heating zone 232 may include an indication apparatus 234 for transferring energy to the electrically conductive reinforcing fibers 218 (FIGS. 3 and 4) of the laminae 214 in the layered structure 212.

Figure 5:
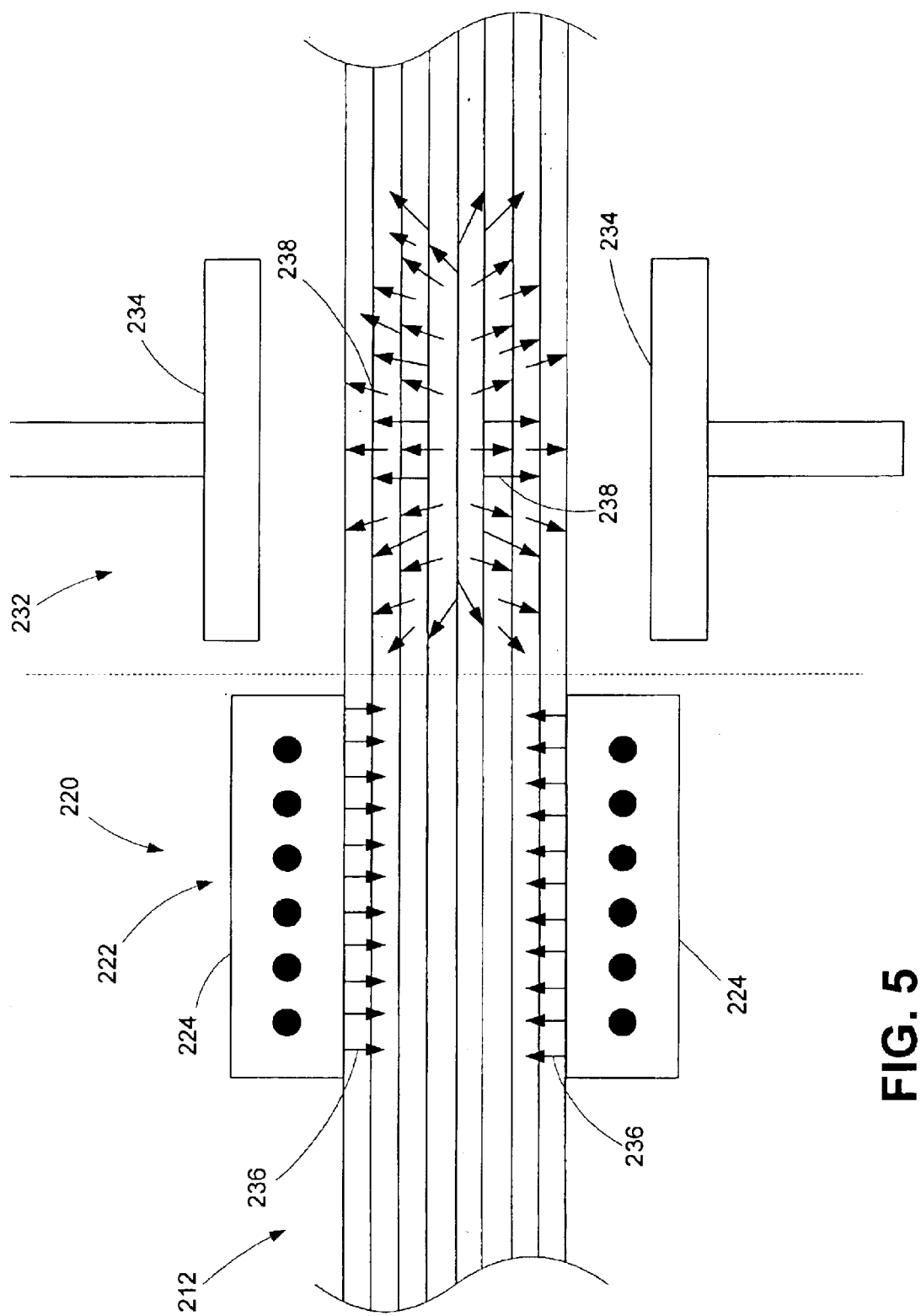
FIG. 5 is a plan view of a layered structure with individual lamina peeled back to show certain aspects of the layered structure.

Referring to FIG. 5, an enlarged view of the preheat zone 220 and volumetric heating zone 232 is shown. As described above, the surface heater 222 heats the surface of the layered structure 212 such that heat is transferred conductively therethrough as indicated by arrows 236. However, in the volumetric heating zone 232, the inductive coils transfer energy to the electrically conductive reinforcing fibers 218 such that heat is generated at multiple locations throughout the volume of the layered structure 212 as indicated by arrows 238. By volumetrically heating the layered structure 212, a thermal equilibrium within the layered structure 212 is quickly and efficiently obtained. For example, by using inductive heating, the temperature of the layered structure 212 might be increased at a rate of approximately 100° C. per second. Of course, such rates might be higher or lower with the upper limit largely being defined by the characteristics of the matrix material being processed. Thus, the internal lamina 214 may be heated to the required temperature very quickly without overheating the surface of the layered structure 212 which might result in material degradation.

Figure 6:
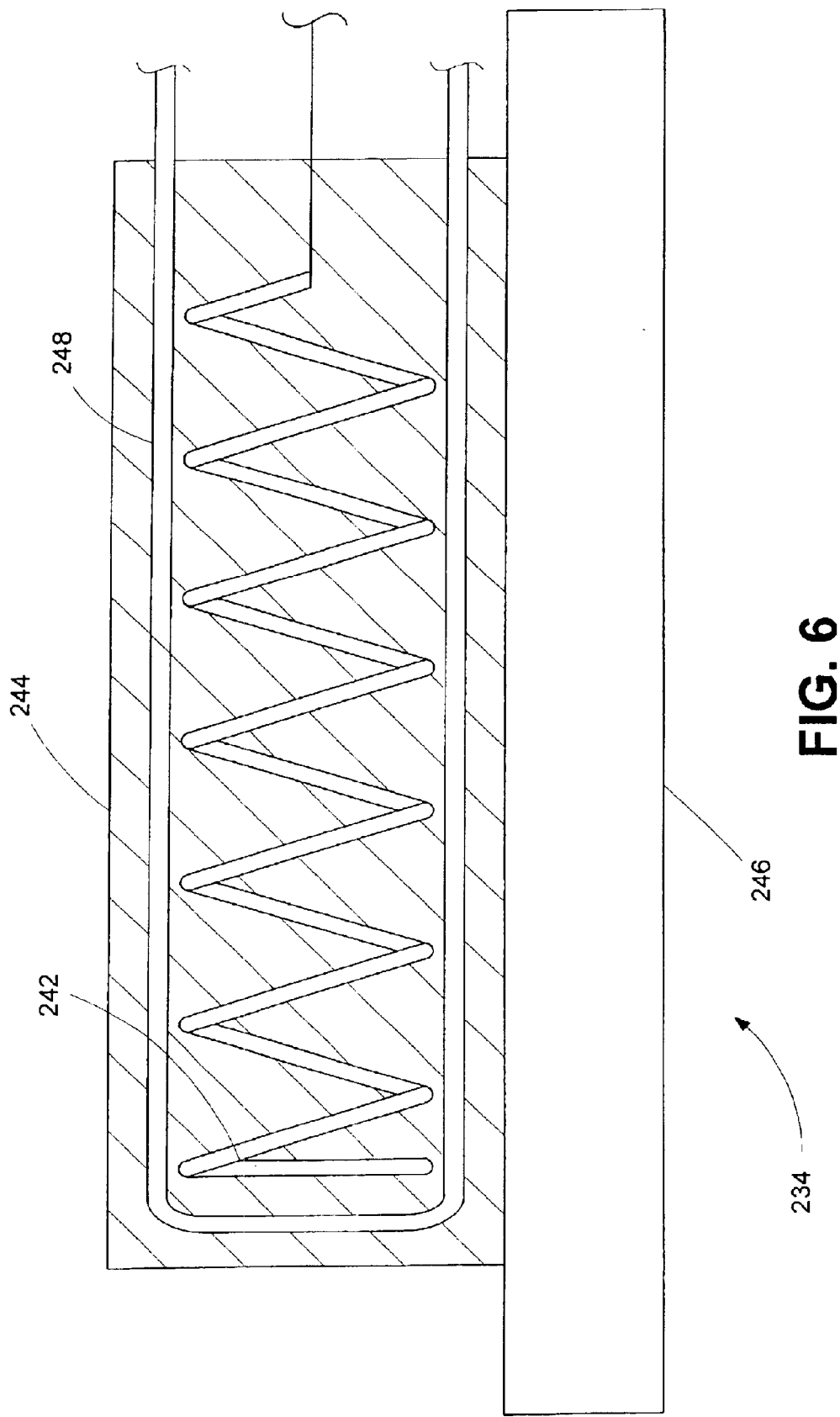
FIG. 6 is a partial cross-sectional view of an induction coil according to one aspect of the present invention.

Referring to FIG. 6, an exemplary induction apparatus 234 is shown. The induction apparatus 234 includes an induction coil 242 which may be cast in a nonconductive polymer 244. One or more ceramic platens 246 may be positioned to isolate the induction coil from the high temperatures of the layered structure 212. Additionally, a coolant line 248 may be provided to maintain the temperature of the induction apparatus 234 at or below a specified temperature. As will be understood and appreciated by those of skill in the art, the induction coil 242 may be designed to impart a desired inductive flux pattern. Thus, in conjunction with the present invention, the induction coil 242 may be designed to produce a specific pattern which optimizes the transfer of energy to the layered structure 212 depending on the fibrous patterns formed therein.

For example, optimum transfer of energy to a layered structure 212 exhibiting a pattern of reinforcing fibers 218 such as is shown in FIG. 4 may require an induction coil 242 having a first design. On the other hand, optimum transfer of energy to a layered structure 212 exhibiting a pattern of reinforcing fibers 218 arranged at substantially 90° angles from one lamina 214 to an adjacent lamina 214 may require an induction coil 242 having a different design.

The induction coil 242 is desirably adjustable with respect to both frequency and power. Thus, for example, the induction coil may be operated at a frequency of 2.3 MHz when processing a layered structure 212 formed of thermoplastic and exhibiting a thickness of approximately 1 mm. However, the induction coil 242 may be operated at a different frequency when processing a layered structure 212 formed of a different material or which exhibits a different thickness. Likewise, the power level of the induction coil might be adjusted to accommodate layered structures 212 of varied compositions and arrangements.

It is further noted that the induction coil 242, in conjunction with the layered pattern of reinforcing fibers 218, is desirably configured so as to generate heat uniformly throughout the layered structure 212. This desirably includes uniformity across the width of the layered structure 212 as well as through the thickness of the layered structure.

Referring back to FIG. 2, the volumetric heating zone 232 efficiently heats the laminae 214 of the layered structure 212 to a sufficient temperature resulting in the melting thereof in the case of a thermoplastic matrix, or the curing thereof (or more particularly, the partial curing thereof) in the case of a thermoset matrix. By heating the layered structure 212, the laminae 214 bond with one another to create a more unified structure as will be appreciated by those of ordinary skill in the art.

The volumetric heating zone 232 may further include one or more temperature sensors such as, for example, an infrared sensor 240 for monitoring the temperature of the layered structure and controlling the induction apparatus 234 as is necessary. For example, given a specified material composition and thickness, it may be desirable to raise the temperature of the layered structure 212 to within 10° C. of a predetermined temperature.

A consolidation zone 250 follows the volumetric heating zone 232 and may include, for example, one or more rollers 252 configured to apply pressure to the layered structure 212 to further bond and to remove voids between the melted laminae 214. The rollers may be configured to apply pressure according to a specified pressure-time profile depending on, for example, the type of material being processed, the temperature of the layered structure 212 or the thickness of the layered structure 212.

The rollers 252 are desirably maintained at a reduced temperature relative to the temperature of the layered structure 212. For example, the rollers 252 are desirably maintained at a temperature below the glass temperature ($T_g$) of the matrix material in the laminae 214. Thus, in one embodiment, the rollers 252 may be maintained at ambient or room temperature for cooling the surface of the layered structure 212. One advantage of maintaining the rollers 252 at a reduced temperature is the prevention of resin buildup on the rollers 252, which may occur due to pressurized contact with the surface of the layered structure 212. The rollers 252 may be maintained at a specified temperature by, for example, flowing a coolant through the interior of the rollers 252 or by other means as will be recognized by those of ordinary skill in the art.

While alternative pressure mechanisms such as platens may be used to effect consolidation, the use of a roller 252 amplifies the applied pressure due to the small area of contact between the roller 252 and the layered structure 212. An exemplary roller 252 may be made of stainless steel and is configured to resist bending during application of a predetermined maximum amount of pressure to the layered structure 212, thereby ensuring a uniform application of pressure and a uniform thickness of the resultant composite structure 202. Additionally, it is desirable that the rollers 252 be adjustable so as to accommodate layered structures 212 of varied thicknesses as well as to vary the amount of pressure being applied to the layered structure 212. The pressure applied through the roller 252 is used to prevent growth of voids in the composite structure and achieve the desired mechanical properties.

After passing through the consolidation zone 250, the layered structure 212 passes through a quenching zone 260. The quenching zone 260 includes a cooling apparatus 262 for cooling the layered structure 212 in a directionally controlled manner about a centerline, or a midplane 264, of the layered structure 212. By rapidly cooling the layered structure 212, hot internal voids within the material are prevented from growing to unacceptable levels subsequent to the consolidation process. Additionally, the cooling of the layered structure 212 in a directionally controlled manner may include, for example, cooling the layered structure 212 substantially symmetrically about the midplane 264, which prevents the layered structure 212 from warping and thereby produces a resultant structure which exhibits less variance from one composite structure to another.

The cooling apparatus 262 may include one or more platens 266A, 266B (collectively referred to herein as "platens 266") maintained at a desired temperature by flowing coolant through one or more passages 268 formed in the platens 266. The platens 266 may also be configured to apply a predetermined amount of pressure, desirably a reduced amount of pressure relative to the rollers 252 of the consolidation zone 250, to the layered structure 212. The pressure applied by the platens 266, combined with the rapid cooling, serves to prevent growth of hot internal voids in the interior of the layered structure 212 as the consolidation zone 250 does not substantially cool the interior of the layered structure 212. Additionally, the quenching zone reduces warping in the resultant composite structure 202. The quenching zone 260 serves to reduce the temperature of the layered structure 212 about its midplane 264 below the glass transition temperature of a thermoplastic matrix material when such material is being utilized.

In another embodiment, the quenching zone 260 may be configured such that the upper cooling platen 266A is maintained at a different temperature than that of the lower cooling platen 266B such that the cooling in a directionally controlled manner includes controlled asymmetric cooling of the layered structure 212. Controlled asymmetric cooling of the layered structure 212 allows for the layered structure to be formed into a desired shape and/or allows for a predetermined stress state to be imparted to the resultant structure. For example, by maintaining a specified temperature differential between the upper and lower platens 266A and 266B, with the lower platen having the reduced temperature, the resultant composite structure will exit the laminator 200 curving downwards with a specified radius of curvature. Additionally, the temperature of the platens 266A and 266B may be individually adjustable so as to better define the resultant shape of the composite structure 202.

Such asymmetric quenching provides an advantage of forming the layered structure 212 into a predefined shape during the lamination process, rather than having to preform subsequent operations to the layered structure 212 thereafter.

The quenching zone 260 may also include one or more sensing devices such as, for example, an infrared sensor 270 for monitoring the temperature of the layered structure 212 and/or a device such as a thermocouple 272 for monitoring the temperature of the platen 266. The sensing devices may, as disclosed above, be incorporated as part of a control loop as may be desired.

A substantially void-free (i.e., less than 1% void by volume) laminated composite structure 202 exits the quenching zone 260 and the laminator 200 having been processed at an increased rate of throughput relative to conventional methods including surface heating and vacuum debulk or autoclave consolidation processes.

A controller 274 may be operatively coupled with the laminator 200 to provide automation of the process based on temperature, pressure and time profiles for a given material at a given thickness. Thus, in operation, an operator may feed the layered structure 212 into the laminator 220 and the remaining process will be automated. Such controls are known in the art and are not described in greater detail herein. Additionally, the controller 274 may be coupled with one or more of the various sensing devices (e.g., 228, 230, 240, 270, 272) to form various feedback loops in controlling the laminator 200.

It is further noted that the layered structure 212 processed by the laminator 200 may be an individual component, such as a dimensional sheet or panel, which may be processed in what is referred to as a discontinuous feed mode, meaning that each individual dimensional sheet or panel must be individually fed through the machine. In such a case, for example, the individual sheets of panels may be fed into the inlet 208 by a conveyor or by the front drive rollers 206A, which then feeds the sheet through the laminator 200 to the rear drive rollers 206B. In feeding an individual sheet in such a manner, it is noted that only half a sheet is processed as it is fed through the laminator 200. Thus, the first half of the sheet (i.e., a dimensional layered structure 212) is not initially processed as the laminator 200 does not begin to heat the material until the rear drive rollers 206B place tension in the reinforcing fibers 218 of the layered structure 212. Therefore, when operating in a discontinuous feed mode, the individual sheet will be fed through the laminator 200 a first time to process one half of the sheet, and subsequently fed through the laminator 200 a second time, oriented at 180° from the first time, to process the second half of the sheet.

Alternatively, the layered structure 212 may comprise a continuous roll of material (or continuous rolls of lamina 214) fed through the laminator 200. In such a case, the process may be referred to as a continuous feed mode. When operating the laminator in a continuous feed mode, the resulting composite structure 202 may be fed through a cutting and trimming apparatus 290 which may be incorporated with the laminator 200 or may be an independent apparatus.

Regardless of whether the laminator is operated in a continuous feed mode or a discontinuous feed mode, the lamination of the layered structure 212 (whether it be a dimensional sheet or a continuous feed of the layered structure 212) may be described as being a continuous process since the layered structure 212 may be continually fed from one stage or zone to another and since one process is being performed on one portion of the layered structure while another process is simultaneously being performed on another portion of the layered structure. Of course, in referring to the lamination as a continuous process, the term is meant to take into account natural work stoppages, the feeding of individual sheets and so forth. Additionally, as discussed above herein, the continual nature of the process may be adjusted to accommodate varied processing rates based on such factors as material selection and geometries.

In another manner of describing the above process, a layered structure 212 may be provided in the laminator 200 wherein various portions of the layered structure experience different operations at substantially the same time. For example, as seen in FIG. 2, a single layered structure may have a first portion being preheated, a second portion being volumetrically heated; a third portion being consolidated, and a fourth portion being quenched, all substantially simultaneously. Of course, depending on such factors as the configuration of the laminator 200, the physical size of the layered structure 212, whether the laminator is operated in continuous or discontinuous feed mode, and the type of material being processed, the layered structure 212 may experience fewer activities at a given time.

Figure 7:
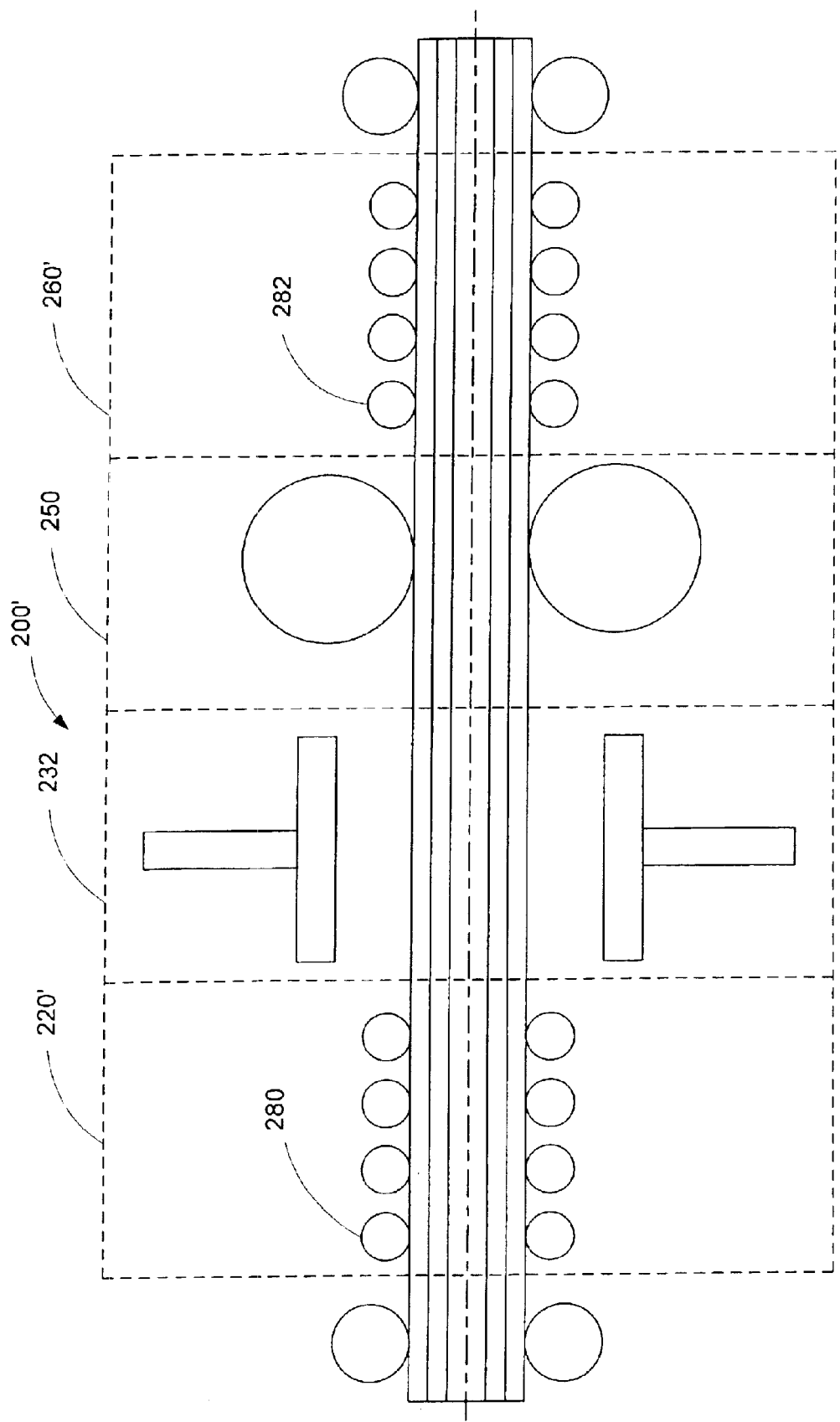
FIG. 7 shows an apparatus for processing laminate composite structures according to another embodiment of the present invention.

Referring to FIG. 7, another embodiment of the laminator 200' is shown. The laminator 200' includes the same stages or zones as shown and described with respect to FIG. 2. Thus, the laminator 200' includes a preheat zone 220', a volumetric heating zone 232, a consolidation zone 250, and a quenching zone 260'. However, the preheat zone 220' includes a plurality of heated rollers 280 in lieu of the platens or shoes 224 of FIG. 2. Additionally, the quenching zone 260' includes a plurality of chilled rollers 282 in place of the platen or shoe 266 shown in FIG. 2.

Figure 8:
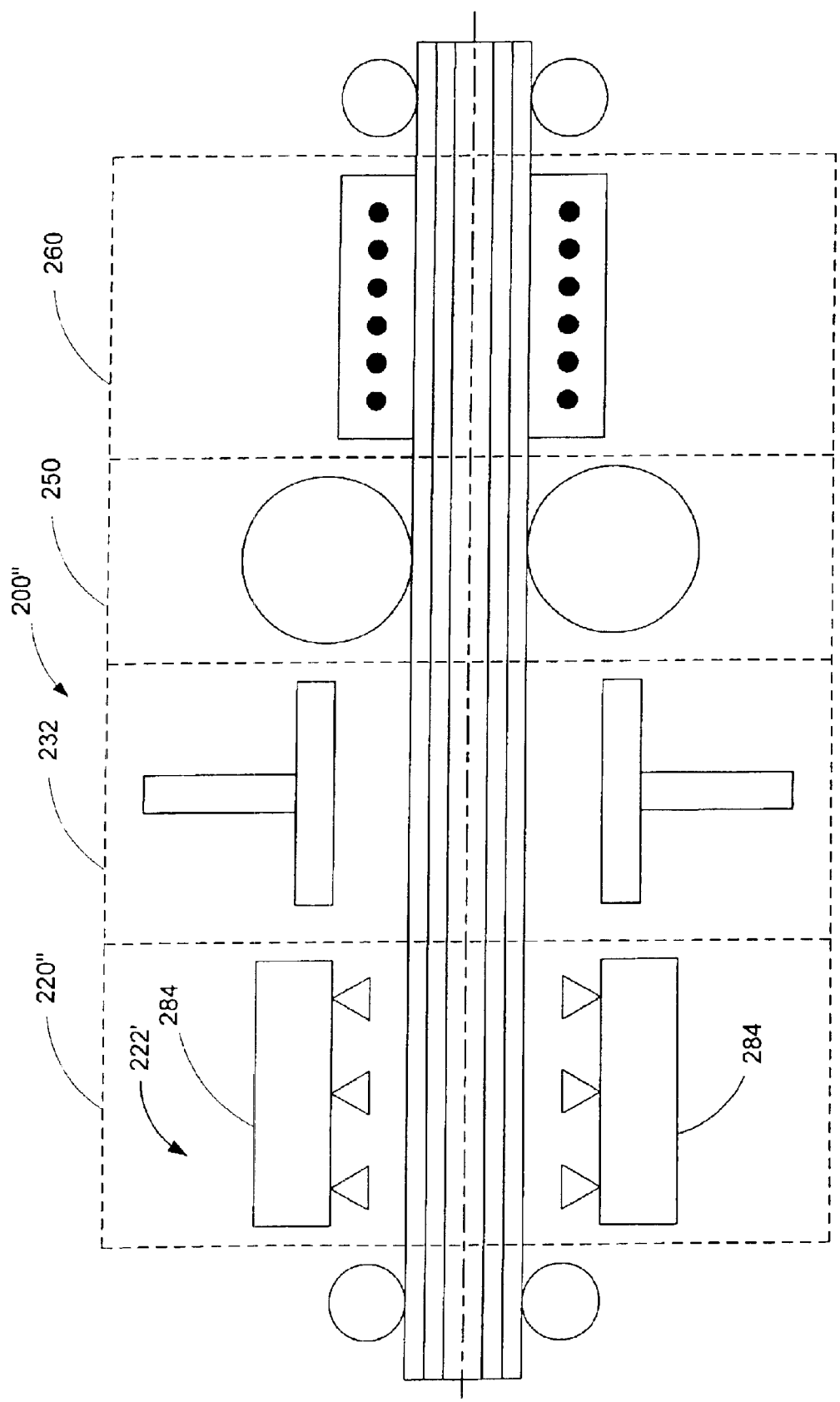
FIG. 8 shows an apparatus for processing laminate composite structures according to yet another embodiment of the present invention.

Referring to FIG. 8, yet another embodiment of the laminator 200" is shown. Again, the laminator 200" is similar to the laminator 200 depicted in FIG. 2; however, the preheat zone 220" includes a noncontacting heat source 222' which may include, for example, an infrared heater or a forced gas heater 284.

EXAMPLE

As an example of the process and operation of the apparatus described above, a laminator similar to that described in FIG. 2 was constructed and tested with an 8 ply layered structure. The individual plies or lamina included a PEI matrix reinforced with carbon fiber and were 12 inches by 36 inches in dimension. The laminator was configured to process the layered structure at a throughput rate of 5 feet per minute (fpm) in both discontinuous and continuous feed modes (denoted as "discont." and "cont." respectively in TABLE 1 below). The carbon fibers of the layered structure were oriented in the pattern as described herein with respect to FIG. 4 above, i.e., $[0/30/0/-30]_s$.

The resulting mechanical properties of the laminate composite structure produced according to the above-described process were compared with a similar laminate composite structure formed using a vacuum debulk process and are shown in TABLE 1 below.

TABLE 1

| Process | Longitudinal Tensile Strength (ksi) | Longitudinal Tensile Modulus (msi) | Transverse Tensile Strength (ksi) | Longitudinal Tensile Modulus (msi) | Cycle Time (seconds) |
|---|---|---|---|---|---|
| Vacuum Debulk | 191.7 ± 7.1 | 13.3 ± 0.5 | 16.3 ± 1.1 | 1.45 ± 0.04 | 300 |
| Laminator @ 5 ft/min | 182.4 ± 2.8 | 13.6 ± 0.3 | 16.5 ± 0.3 | 1.5 ± 0.03 | 72 (discont.) 36 (cont.) |

As is shown in TABLE 1, the throughput rates (cycle times) when using the laminator were dramatically improved and the mechanical properties were substantially the same, and in most cases slightly improved, when compared to the vacuum bulk process. Additionally, the consistency of the mechanical properties was improved over that of the vacuum debulk process, i.e., the variance was reduced.

It is noted that the cycle time for the laminator in discontinuous feed mode was twice that of the cycle time for the laminator in continuous feed mode. This is a result of feeding the material through twice in the discontinuous feed mode in order to process or laminate the entire sheet as has been described above.

The resulting structure exhibited a cross section with a majority of any voids being toward the edge or the surface of the structure and having fewer voids in the center of the structure. The laminate quality metrics of the resulting structure included flatness of less than 1.5% and average void content of less than 1% as understood in the art.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A method of forming a composite laminate structure, the method comprising:
   providing at least two laminae containing electrically conductive reinforcing fibers, the at least two laminae being configured in a layered arrangement;
   volumetrically heating the layered arrangement by inductively transferring energy to the electrically conductive reinforcing fibers of the at least two laminae;
   substantially simultaneously cooling and applying pressure to at least a portion of a surface of the layered arrangement; and quenching the layered arrangement in a directionally controlled manner with respect to a midplane thereof including substantially symmetrically quenching the layered arrangement with respect to the midplane thereof.

2. The method according to claim 1, further comprising surface heating the layered arrangement prior to volumetrically heating the layered arrangement.

3. The method according to claim 2, wherein the surface heating includes contacting the at least a portion of the surface of the layered arrangement with at least one heated platen.

4. The method according to claim 3, further comprising determining a temperature of the layered arrangement during the surface heating of the layered structure.

5. The method according to claim 4, further comprising maintaining a temperature of the at least one heated platen within approximately 2° C. of a predetermined temperature.

6. The method according to claim 2, wherein the surface heating, the volumetrically heating, the substantially simultaneously cooling and applying pressure, and the quenching in a directionally controlled manner are carried out as a continuous process.

7. The method according to claim 1, further comprising determining a temperature of the layered arrangement while the layered arrangement is being volumetrically heated.

8. The method according to claim 7, further comprising maintaining the temperature of the layered arrangement within 10° C. of a predetermined temperature.

9. The method according to claim 1, wherein the volumetrically heating the layered arrangement includes heating the layered arrangement at a rate of up to 100° C. per second.

10. The method according to claim 1, wherein the providing at least two laminae containing electrically conductive reinforcing fibers includes orienting the reinforcing fibers of one lamina of the at least two laminae at a specified angle relative to the reinforcing fibers of at least one other lamina of the at least two laminae.

11. The method according to claim 1, wherein providing at least two laminae includes providing a first lamina of thermoplastic material and at least one other lamina of thermoplastic material, and wherein volumetrically heating the layered arrangement further includes melting the first lamina and the at least one other lamina of thermoplastic material.

12. The method according to claim 1, wherein providing at least two laminae includes providing a first lamina of thermoset material and at least one other lamina of thermoset material, and wherein volumetrically heating the layered arrangement further includes effecting partial curing of the layered arrangement.

13. The method according to claim 1, wherein the volumetrically heating is carried out on a first portion of the layered arrangement, the substantially simultaneously cooling and applying pressure is carried out on a second portion of the layered arrangement and the quenching in a directionally controlled manner is carried out on a third portion of the layered arrangement in a substantially simultaneous manner.

14. A method of forming a composite laminate structure, the method comprising:
providing at least two laminae containing electrically conductive reinforcing fibers, the at least two laminae being configured in a layered arrangement;
volumetrically heating the layered arrangement by inductively transferring energy to the electrically conductive reinforcing fibers of the at least two laminae;
substantially simultaneously cooling and applying pressure to at least a portion of a surface of the layered arrangement; and
quenching the layered arrangement in a directionally controlled manner with respect to a midplane thereof including asymmetrically quenching the layered arrangement with respect to the midplane thereof.

15. The method according to claim 14, further comprising surface heating the layered arrangement prior to volumetrically heating the layered arrangement.

16. The method according to claim 15, wherein the surface heating includes contacting the at least a portion of the surface of the layered arrangement with at least one heated platen.

17. The method according to claim 16, further comprising determining a temperature of the layered arrangement during the surface heating of the layered structure.

18. The method according to claim 17, further comprising maintaining a temperature of the at least one heated platen within approximately 2° C. of a predetermined temperature.

19. The method according to claim 14, wherein the surface heating, the volumetrically heating, the substantially simultaneously cooling and applying pressure, and the quenching in a directionally controlled manner are carried out as a continuous process.

20. The method according to claim 14, further comprising determining a temperature of the layered arrangement while the layered arrangement is being volumetrically heated.

21. The method according to claim 20, further comprising maintaining the temperature of the layered arrangement within 10° C. of a predetermined temperature.

22. The method according to claim 14, wherein the volumetrically heating the layered arrangement includes heating the layered arrangement at a rate of up to 100° C. per second.

23. The method according to claim 14, wherein the providing at least two laminae containing electrically conductive reinforcing fibers includes orienting the reinforcing fibers of one lamina of the at least two laminae at a specified angle relative to the reinforcing fibers of at least one other lamina of the at least two laminae.

24. The method according to claim 14, further comprising forming the layered arrangement to a desired shape through the asymmetric quenching thereof.

25. The method according to claim 14, wherein providing at least two laminae includes providing a first lamina of thermoplastic material and at least one other lamina of thermoplastic material, and wherein volumetrically heating the layered arrangement further includes melting the first lamina and the at least one other lamina of thermoplastic material.

26. The method according to claim 14, wherein providing at least two laminae includes providing a first lamina of thermoset material and at least one other lamina of thermoset material, and wherein volumetrically heating the layered arrangement further includes effecting partial curing of the layered arrangement.

27. The method according to claim 14, wherein the volumetrically heating is carried out on a first portion of the layered arrangement, the substantially simultaneously cooling and applying pressure is carried out on a second portion of the layered arrangement and the quenching in a directionally controlled manner is carried out on a third portion of the layered arrangement in a substantially simultaneous manner.

28. A method of forming a composite laminate structure, the method comprising:

providing at least two laminae containing electrically conductive reinforcing fibers, the at least two laminae being configured in a layered arrangement;

surface heating the layered arrangement prior to volumetrically heating the layered arrangement;

volumetrically heating the layered arrangement by inductively transferring energy to the electrically conductive reinforcing fibers of the at least two laminae;

substantially simultaneously cooling and applying pressure to at least a portion of a surface of the layered arrangement; and quenching the layered arrangement in a directionally controlled manner with respect to a midplane thereof, wherein the surface heating, the volumetrically heating, the substantially simultaneously cooling and applying pressure, and the quenching in a directionally controlled manner are carried out as a continuous process.

29. A method of forming a composite laminate structure, the method comprising:

providing at least two laminae containing electrically conductive reinforcing fibers including configuring the at least two laminae in a layered arrangement and orienting the reinforcing fibers of one lamina of the at least two laminae at a specified angle relative to the reinforcing fibers of at least one other lamina of the at least two laminae;

surface heating the layered arrangement prior to volumetrically heating the layered arrangement volumetrically heating the layered arrangement by inductively transferring energy to the electrically conductive reinforcing fibers of the at least two laminae;

substantially simultaneously cooling and applying pressure to at least a portion of a surface of the layered arrangement; and quenching the layered arrangement in a directionally controlled manner with respect to a midplane thereof.

30. A method of forming a composite laminate structure, the method comprising:

providing at least two laminae containing electrically conductive reinforcing fibers, the at least two laminae being configured in a layered arrangement;

volumetrically heating the layered arrangement by inductively transferring energy to the electrically conductive reinforcing fibers of the at least two laminae;

substantially simultaneously cooling and applying pressure to at least a portion of a surface of the layered arrangement; and quenching the layered arrangement in a directionally controlled manner with respect to a midplane thereof, wherein the volumetrically heating is carried out on a first portion of the layered arrangement, the substantially simultaneously cooling and applying pressure is carried out on a second portion of the layered arrangement and the quenching in a directionally controlled manner is carried out on a third portion of the layered arrangement in a substantially simultaneous manner.

* * * * *